United States Patent
Grover et al.

(10) Patent No.: US 9,078,238 B1
(45) Date of Patent: Jul. 7, 2015

(54) METHOD AND APPARATUS FOR APPLICATION DATA TRANSPORT HANDLING

(71) Applicant: Ford Global Technologies, LLC, Dearborn, MI (US)

(72) Inventors: Joey Ray Grover, Madison Heights, MI (US); Philip Joseph Danne, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 14/148,301

(22) Filed: Jan. 6, 2014

(51) Int. Cl.
*H04B 7/00* (2006.01)
*H05K 11/02* (2006.01)
*H04W 76/02* (2009.01)
*H04W 4/00* (2009.01)
*H04W 84/18* (2009.01)

(52) U.S. Cl.
CPC ............ *H04W 76/021* (2013.01); *H04W 4/008* (2013.01); *H04W 76/022* (2013.01); *H04W 84/18* (2013.01)

(58) Field of Classification Search
USPC .............. 455/41.1, 41.2, 41.3, 66.1, 344, 345
See application file for complete search history.

(56) References Cited

U.S. PATENT DOCUMENTS

| 7,966,405 | B2 | 6/2011 | Sundaresan et al. |
| 8,374,550 | B2 | 2/2013 | House |
| 2013/0084836 | A1* | 4/2013 | Guenkova-Luy et al. . 455/414.1 |
| 2014/0163771 | A1 | 6/2014 | Demeniuk |

* cited by examiner

*Primary Examiner* — Nguyen Vo
(74) *Attorney, Agent, or Firm* — Jennifer M. Stec; Brooks Kushman P.C.

(57) ABSTRACT

A system includes a processor configured to receive communication requests from a plurality of applications executing on a remote device, requesting communication with a vehicle computing system (VCS). The processor is also configured to save an identifier for each requesting application. The processor is further configured to establish a single communication channel to handle the communication requests. Also, the processor is configured to order the communication requests for delivery and relay data requests from the applications to the VCS over the identified transport format.

20 Claims, 5 Drawing Sheets

US 9,078,238 B1

METHOD AND APPARATUS FOR APPLICATION DATA TRANSPORT HANDLING

TECHNICAL FIELD

The illustrative embodiments generally relate to a method and apparatus for application data transport handling.

BACKGROUND

Vehicle computing systems may provide a variety of connection formats through which external devices can connect. While there may be a number of possible connections, these connections may also be limited in the number of connections that can be handled at a single time. If a device is trying to connect to a vehicle computing system through a connection that is already being used by the maximum number of devices, the connection request may be rejected, which may result in user frustration.

SUMMARY

In a first illustrative embodiment, a system includes a processor configured to receive communication requests from a plurality of applications executing on a remote device, requesting communication with a vehicle computing system (VCS). The processor is also configured to save an identifier for each requesting application. The processor is further configured to establish a single communication channel to handle the communication requests. Also, the processor is configured to order the communication requests for delivery and relay data requests, including the identifier saved for the application originating the request, from the applications to the VCS over the identified transport format.

In a second illustrative embodiment, a computer-implemented method includes receiving communication requests from a plurality of applications executing on a remote device, requesting communication with a vehicle computing system (VCS). The method also includes saving an identifier for each requesting application. The method further includes establishing a single communication channel to handle the communication requests. Also, the method includes ordering the communication requests for delivery and relaying data requests, including the identifier saved for the application originating the request, from the applications to the VCS over the identified transport format.

In a third illustrative embodiment, a non-transitory computer-readable storage medium stores instructions that, when executed by a processor, cause the processor to perform a method that includes receiving communication requests from a plurality of applications executing on a remote device, requesting communication with a vehicle computing system (VCS). The method also includes saving an identifier for each requesting application. The method further includes establishing a single communication channel to handle the communication requests. Also, the method includes ordering the communication requests for delivery and relaying data requests, including the identifier saved for the application originating the request, from the applications to the VCS over the identified transport format.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
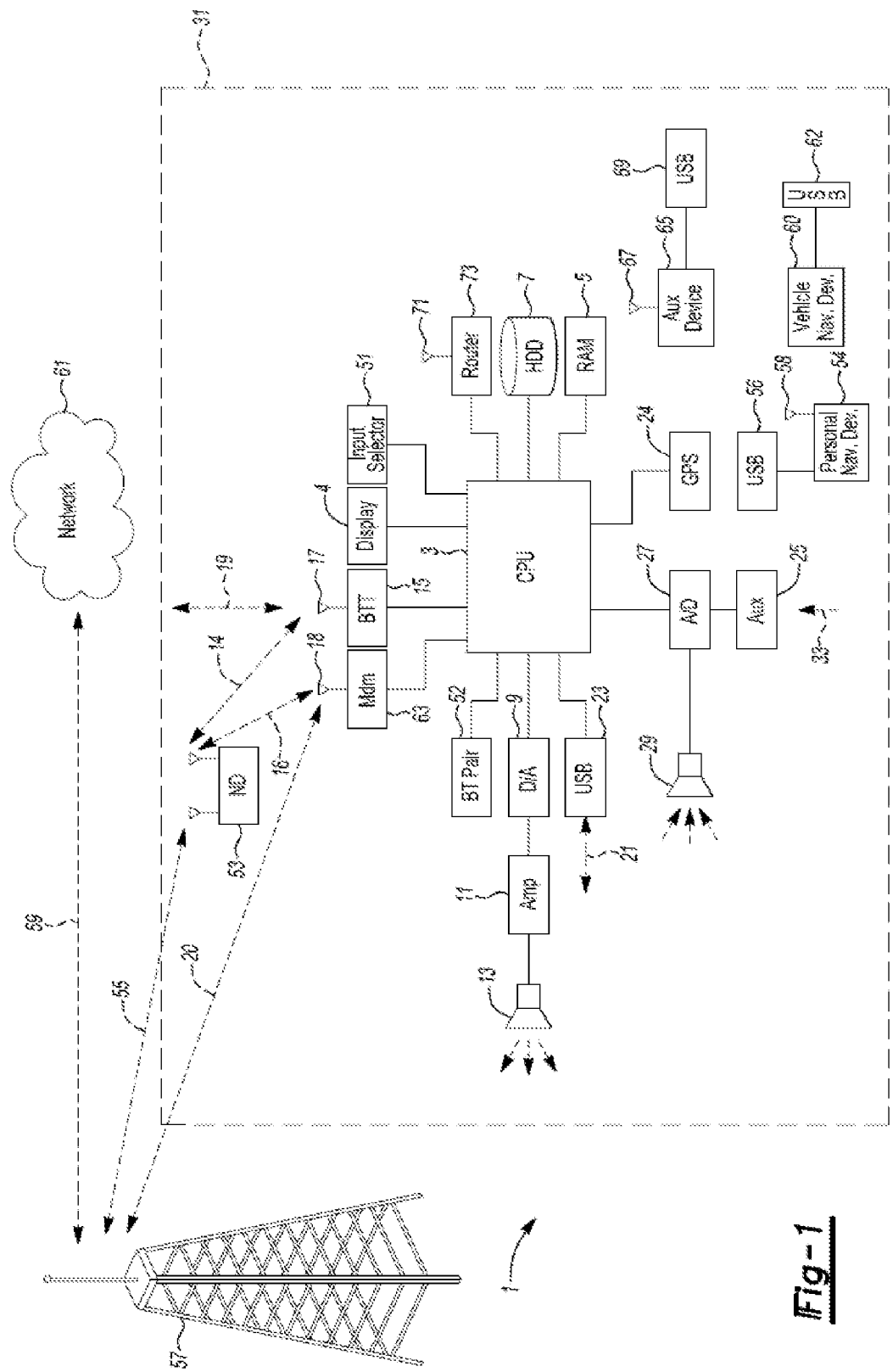
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
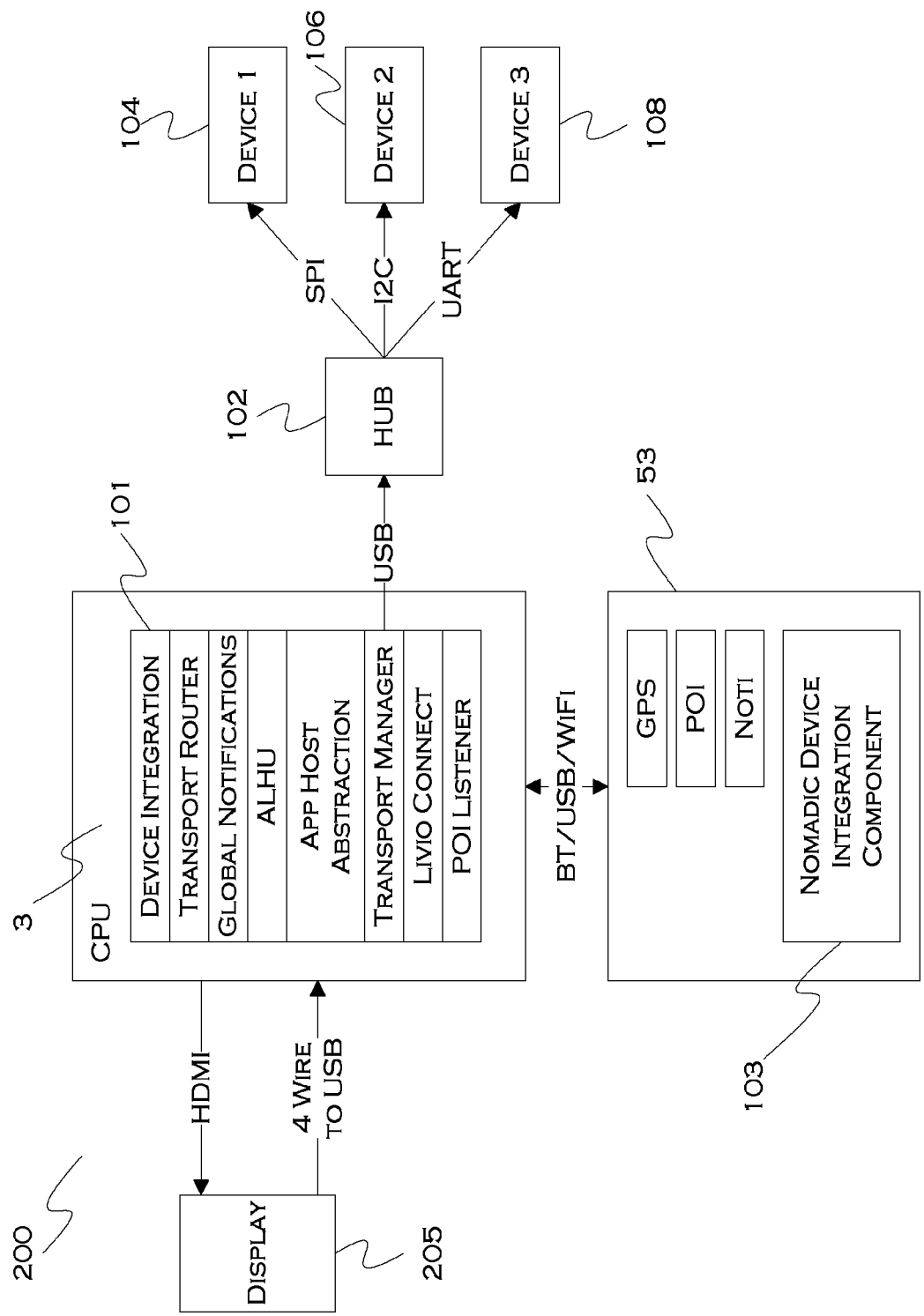
FIG. 2 shows an exemplary block topology of a system for integrating one or more connected devices with the vehicle based computing system according to an embodiment.

FIG. 2 is an exemplary block topology of a system 200 for integrating one or more connected devices with the vehicle based computing system 1 (VCS). The CPU 3 may be in communication with one or more transceivers. The one or more transceivers are capable for wired and wireless communication for the integration of one or more devices. To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 to take advantage of the services provided by the device integration framework 101.

The one or more transceivers may include a multiport connector hub 102. The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

Vehicle computing systems may provide a variety of connection formats through which external devices can connect. While there may be a number of possible connections, these connections may also be limited in the number of connections that can be handled at a single time. If a device is trying to connect to a vehicle computing system through a connection that is already being used by the maximum number of devices, the connection request may be rejected, which may result in user frustration.

In order to address this possible difficulty, the illustrative embodiments propose that a routing service be utilized to handle the external connections to a vehicle computing system. The routing service can handle some or all of the actual communication protocols with the vehicle computing system itself. Requests from external devices and/or applications can pass through the routing service. These requests may designate a preferred communication protocol (e.g., without limitation, Bluetooth, Near Field Communication, WiFi, etc.). The routing service can establish communication over the appropriate channel/protocol, and can serve as a queue manager for pending requests. In this manner, any number of devices can use the communication channels provided by the routing service without worry about running into a maximum number of devices over a given channel/protocol.

Figure 3:
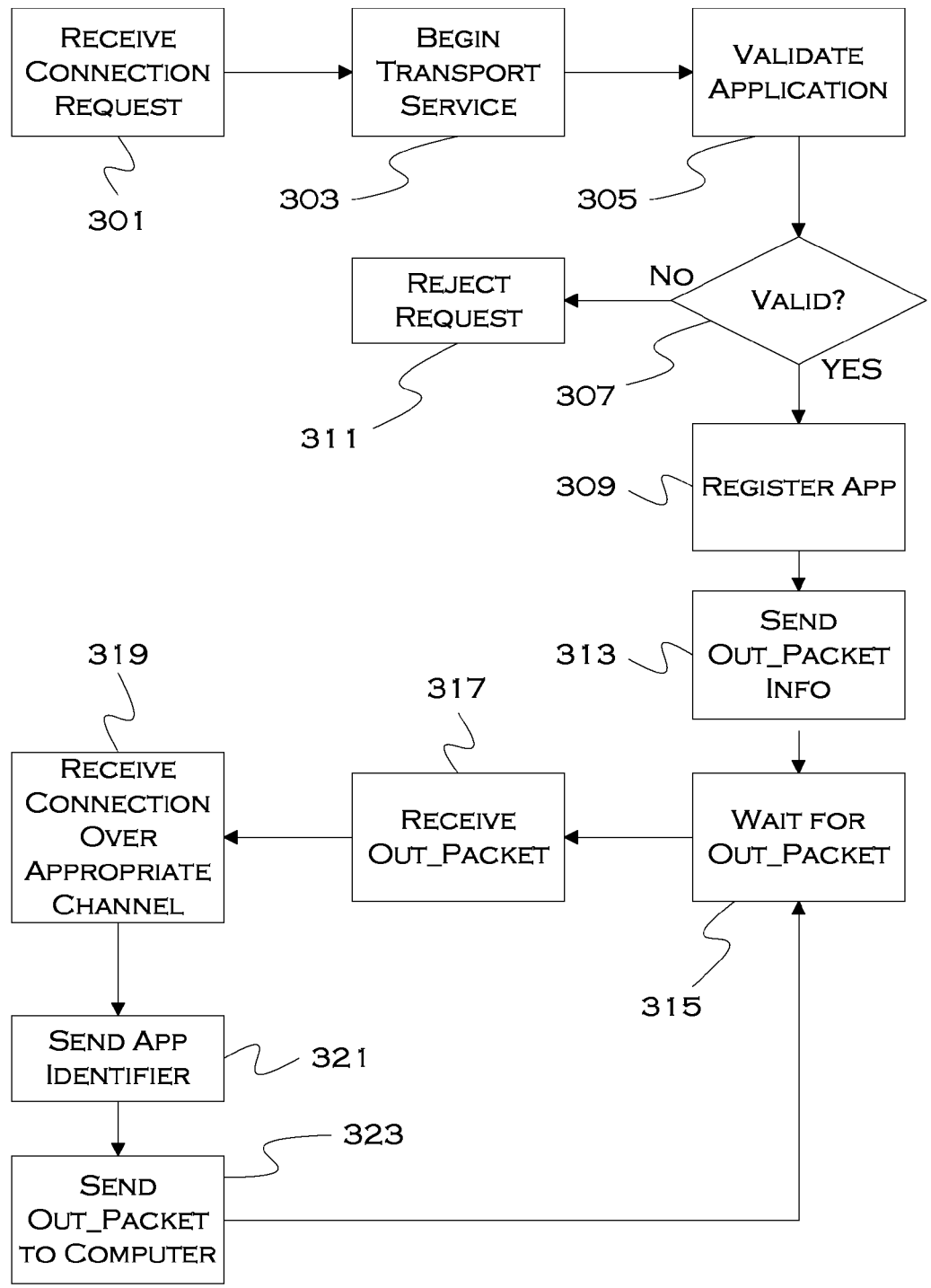
FIG. 3 shows an illustrative example of application to vehicle data handling.

FIG. 3 shows an illustrative example of application to vehicle data handling. In this illustrative example, a process running on a device, and capable of communication with a vehicle computer first receives a communication request from an application running on the device 301. Typically, this request will indicate that communication with the vehicle computing system is desired. A number of parameters may also be included in the request, such as, but not limited to, requesting device ID, requesting application ID, permission related info (e.g., password, key, etc.), and any other suitable information.

Assuming it is not already running, the request will cause the process to begin the transport/routing service 303. This service will run on the device-side and will handling incoming communication from applications to the vehicle computer. This service will not only handle requests from the requesting application, but from other applications that are attempting to communication with the vehicle computer as well. Using any appropriate received and/or stored information, the process will validate the application as being permitted to communicate with the vehicle computing system 305. This may also include contacting the vehicle computing system itself to receive verification of communication permissibility.

If the application is not validated for communication with the vehicle computing system 307, the process will reject the communication request 311 and terminate communication with the requesting application. Otherwise, the process will register the requesting application 309. Registering the requesting application will allow the transport service to distinguish between various application requests headed both to and from the applications. In response to registering the application, the service will send out-packet information back to the requesting application 313, identifying where the service is currently receiving data packets for relay to the vehicle computing system.

The process then waits to receive an out-packet from the requesting application 315. Once a packet is received 317, communication can be established with the vehicle computing system over the appropriate connection 319, in this example, an rfcomm channel. In another example, communication can be established upon routing service inception or receipt of the original request, and maintained until the routing service is terminated or there are no more devices/applications requesting use of a particular connection, as appropriate.

In prior art solutions, each application may be assigned an rfcomm channel, and the available channels may become quickly exhausted. By providing message handling from a plurality of applications, through a single rfcomm channel, any number of applications can be handled by the transport service with use of only a single rfcomm (or other communication) channel.

Once a connection to the vehicle computer has been established over the appropriate channel, the process can send an application identifier to the vehicle computing system so that the system knows the origin of the upcoming data 321. This information can also be included as part of a header on a given data packet. In addition to the identifying data, the process can send the out-packet (received from the requesting application) to the vehicle computer over the appropriate channel.

As previously noted, this transport service can communicate with numerous applications at a time, so multiple requests from different applications can be queued and handled through the single communication channel. If a channel is in use by the service when a request comes in, the service can queue the request until such time as the channel is available for use.

Figure 4:
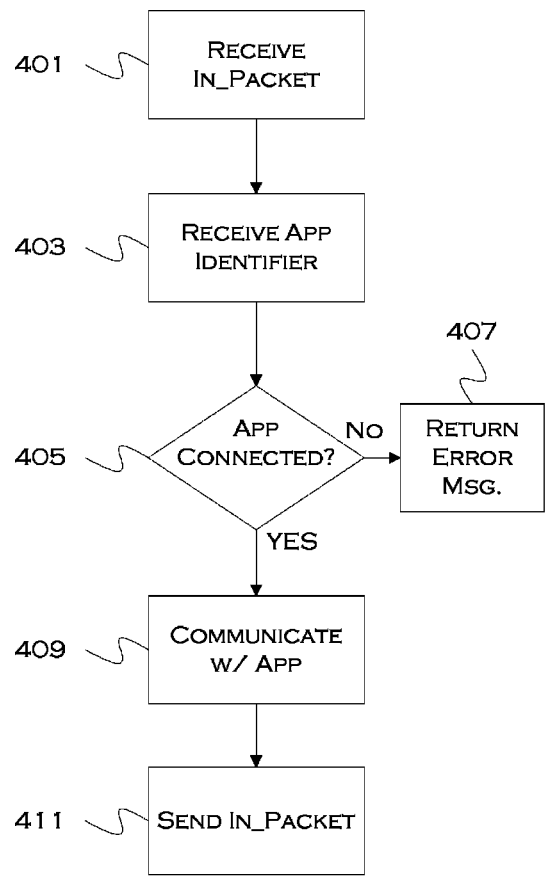
FIG. 4 shows an illustrative example of vehicle to application data handling.

FIG. 4 shows an illustrative example of vehicle to application data handling. In this illustrative example, the process is running vehicle-side and receives an in-packet request from the vehicle computing system 401. In this case, the "in-packet" is a response or packet for an application previously connected to the transport service. Since the application is not communicating directly with the vehicle computer, and since data may need to flow both ways, it may be useful to use the transport service to send data back to the various applications.

Included with the in-packet request may be an application identifier 403. This will identify which application should receive the returning data packet. The process will check to ensure that this application is still connected to the transport service 405. If the application is no longer connected to the transport service, the process may return an error message 407. Otherwise, the process may communicate with the application 409 and send the in-packet from the vehicle computing system to the application 411.

In this model, the transport service runs on both sides of the communication channel. On the device side, it serves to queue and route incoming data requests for the vehicle, and distribute outgoing data to applications from the vehicle. On the vehicle side, it serves to queue and send requests from the vehicle computer to the applications.

Figure 5:
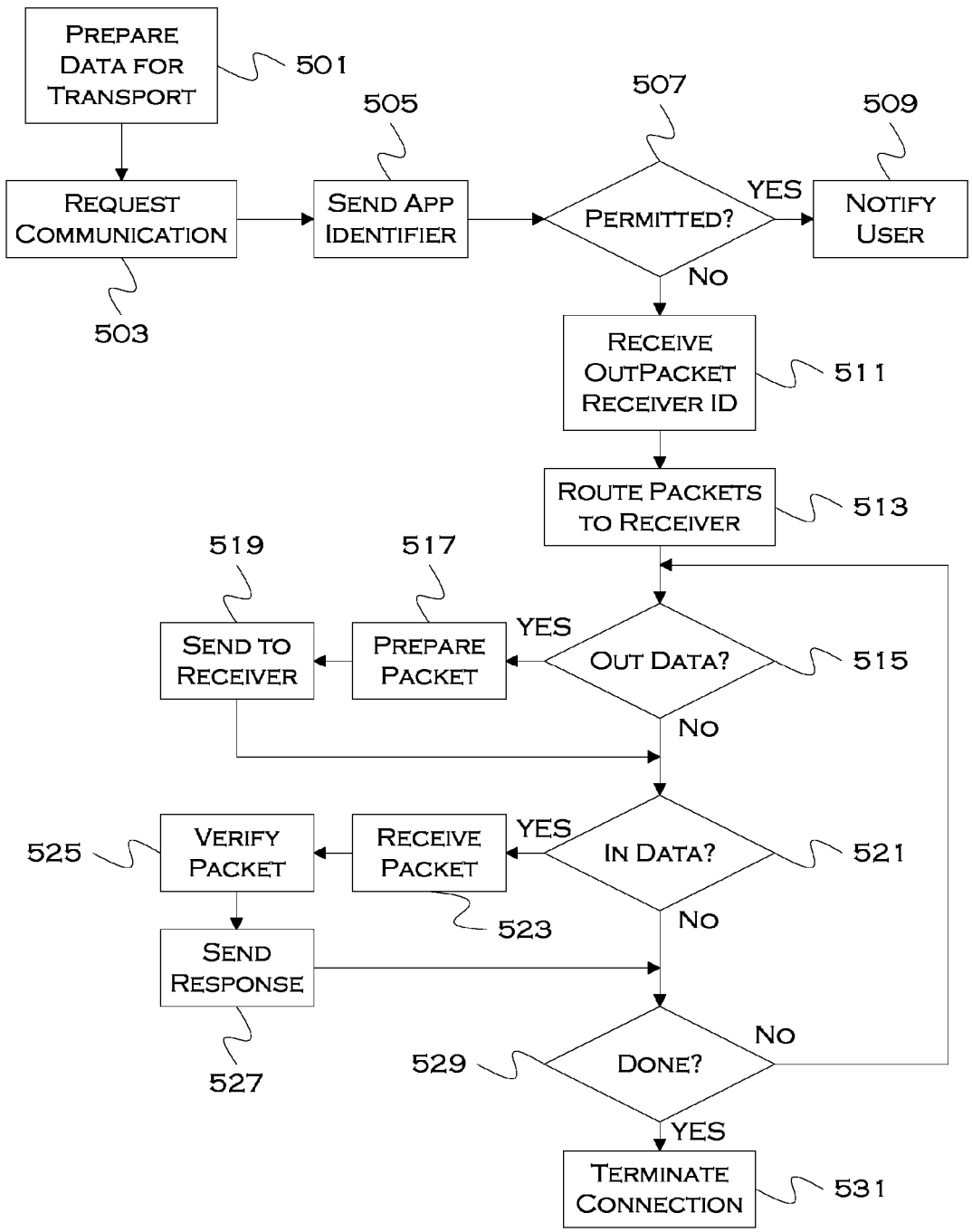
FIG. 5 shows an illustrative example of application-side data request handling.

FIG. 5 shows an illustrative example of application-side data request handling. In this illustrative example, an application desires communication with the vehicle computing system. At some point, a data-packet (the out-packet) will be prepared for transport to the vehicle computing system 501. Once communication is desired, the application may request communication with the vehicle computing system 503. This request will be handled by the transport service, and the requesting application may send an application identifier 505 to the transport service.

If communication is not permitted 507 (which may be known, for example, based on a response from the transport service), the process may notify the requesting application that no communication can be processed at this time 509. Otherwise, the process may receive back an out-packet receiver identifier from the transport protocol 511, showing the application where to send future out-packets for transmission to the vehicle computing system. Future out-packets will then be sent to this identified receipt point 513.

If the application has any out-data to send 515, the application may prepare a packet or packets with out-data 517 and send them to the appropriate point of receipt 519. Similarly, if any data is waiting to be received from the vehicle computing system 521, the process may receive the data from the transport service 523. If needed, the process may also verify any received data 525 (checking for corruption, completeness, etc.) and send any necessary responses back to the vehicle computing system or transport service 527. Until the application terminates 529, the process may repeat this data handling. Once the application has completed communication and is terminated, the connection may also be terminated 531.

Through use of the illustrative embodiments, and similarly configured and functioning systems and processes, communication may be established from multiple applications through a single channel or protocol. Where this communication may have been previously blocked due to unavailability of a channel or transport medium, the proposed transport handling service permits such communication and facilitates ease of use and customer experience.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive communication requests from a plurality of applications executing on a remote device, requesting communication with a vehicle computing system (VCS);
save an identifier for each requesting application;
establish a single communication channel to handle communication requests;
order the communication requests for delivery; and
relay data requests, including the identifier saved for the application originating the request, from the applications to the VCS over the communication channel.

2. The system of claim 1, wherein the communication channel includes an rfcomm channel.

3. The system of claim 1, wherein the communication channel includes near field communication.

4. The system of claim 1, wherein the communication channel includes WiFi.

5. The system of claim 1, wherein the communication channel includes Bluetooth.

6. The system of claim 1, wherein the processor is configured to establish communication over the communication channel following a data delivery request.

7. The system of claim 1, wherein the processor is configured to establish communication over the communication channel prior to a data delivery request.

8. A computer-implemented method comprising:
receiving communication requests from a plurality of applications executing on a remote device, requesting communication with a vehicle computing system (VCS);
saving an identifier for each requesting application;
establishing a single communication channel to handle communication requests;
ordering the communication requests for delivery; and
relaying data requests, including the identifier saved for the application originating the request, from the applications to the VCS over the communication channel.

9. The method of claim 8, wherein the communication channel includes an rfcomm channel.

10. The method of claim 8, wherein the communication channel includes near field communication.

11. The method of claim 8, wherein the communication channel includes WiFi.

12. The method of claim 8, wherein the communication channel includes Bluetooth.

13. The method of claim 8, further comprising establishing communication over the communication channel following a data delivery request.

14. The method of claim 8, further comprising establishing communication over the communication channel prior to a data delivery request.

15. A non-transitory computer-readable storage medium, storing instructions that, when executed by a processor, cause the processor to perform a method comprising:
receiving communication requests from a plurality of applications executing on a remote device, requesting communication with a vehicle computing system (VCS);
saving an identifier for each requesting application;
establishing a single communication channel to handle communication requests;
ordering the communication requests for delivery; and
relaying data requests, including the identifier saved for the application originating the request, from the applications to the VCS over the communication channel.

16. The storage medium of claim 15, wherein the communication channel includes an rfcomm channel.

17. The storage medium of claim 15, wherein the communication channel includes near field communication.

18. The storage medium of claim 15, wherein the communication channel includes WiFi.

19. The storage medium of claim 15, wherein the communication channel includes Bluetooth.

20. The storage medium of claim 15, further comprising establishing communication over the communication channel prior to a data delivery request.

* * * * *